UNITED STATES PATENT OFFICE.

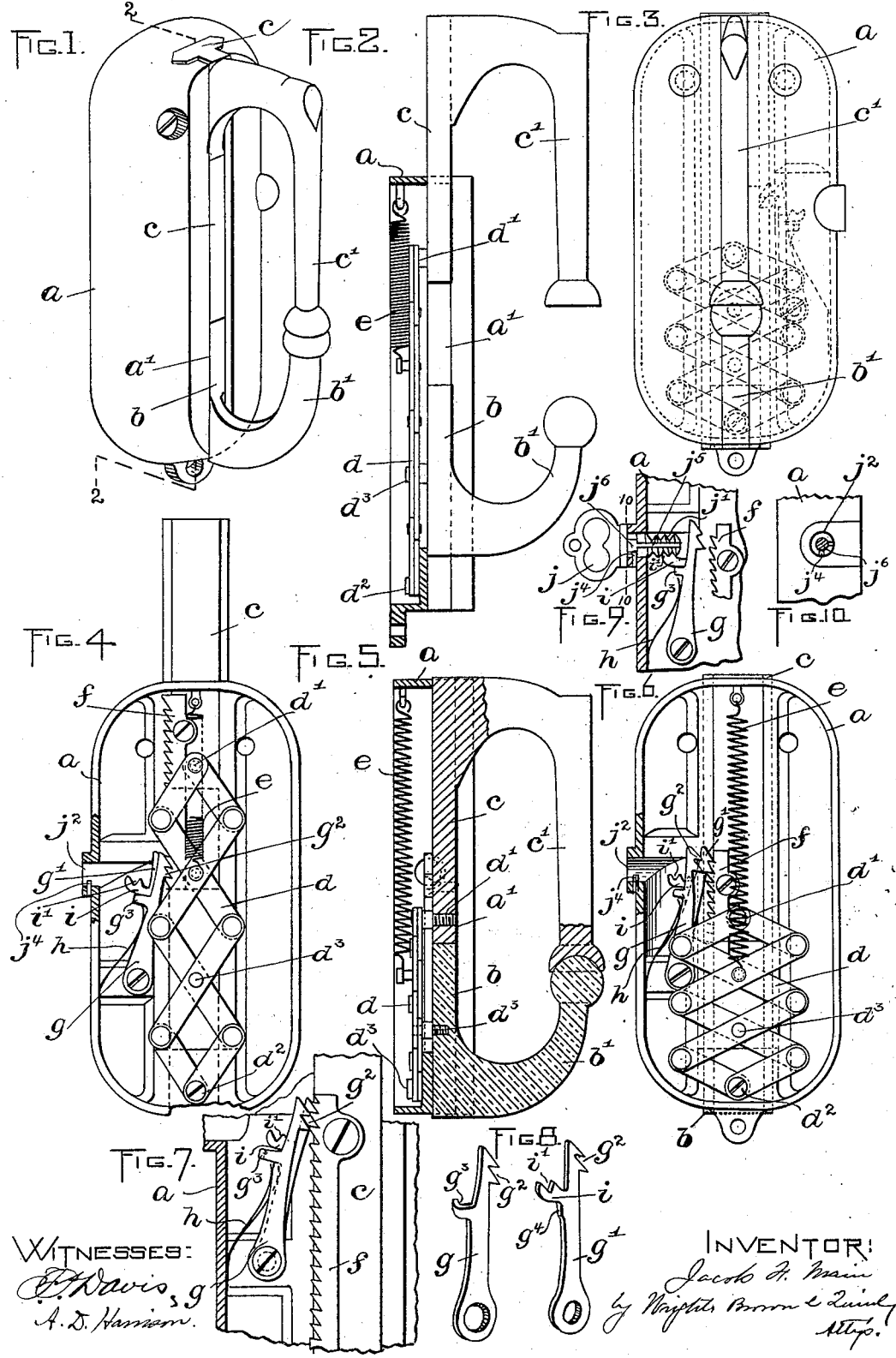

JACOB F. MAIN, OF BOSTON, MASSACHUSETTS, ASSIGNOR TO THOMAS STANLEY PATERSON, OF SAME PLACE.

HAT AND COAT HOOK.

SPECIFICATION forming part of Letters Patent No. 599,062, dated February 15, 1898.

Application filed August 7, 1897. Serial No. 647,412. (No model.)

*To all whom it may concern:*

Be it known that I, JACOB F. MAIN, of Boston, in the county of Suffolk and State of Massachusetts, have invented certain new and useful Improvements in Hat and Coat Hooks, of which the following is a specification.

This invention relates to the type of holder for hats, coats, and other garments shown and described in my Patent No. 569,422, dated October 13, 1896, in which provision is made for locking the article in its support to prevent its unauthorized removal.

The present invention has for its object to provide improved means of connection between the slides which carry the hook and the guard whereby to secure the desired relative movement of these parts.

Another object is to provide improved means for locking the slides whereby a finer adjustment is allowed.

With the above ends in view the invention consists in certain novel features of construction and combinations of parts recited in the appended claims.

The drawings which accompany and form part of this specification illustrate an embodiment of the invention.

Figure 1 shows the appliance in perspective. Fig. 2 shows a longitudinal section in the line 2 2 of Fig. 1 with the hook and guard separated. Fig. 3 shows a front elevation with a dotted-line illustration of concealed parts. Fig. 4 shows a rear elevation under the adjustment shown in Fig. 2 and with some parts broken away. Fig. 5 shows a central longitudinal section with the hook and guard closed together. Fig. 6 shows a view similar to Fig. 4, but with the parts under the adjustment shown in Fig. 5. Fig. 7 shows a detail view of means for locking the slides. Fig. 8 shows the two locking-dogs detached. Fig. 9 shows a detail view of the means for unlocking the dogs. Fig. 10 shows a section on line 10 10 of Fig. 9.

The letter $a$ designates the base-plate or casing, which is formed with holes to accommodate fastening-screws, and is also formed with a longitudinal slideway $a'$ and with a chamber behind the same. A pair of slides $b$ and $c$ are fitted to said slideway, and one carries an upturned hook $b'$, while the other is formed with a pendent guard $c'$, cup-shaped at its lower end to engage the rounded end of the hook. A system of lazy-tongs $d$ is connected at one end with the upper slide $c$ at the point $d'$, at the other end with the base-plate at the point $d^2$, and at an intermediate point $d^3$ with the lower slide $b$. It will be seen that with this mode of connection a lengthening of the lazy-tongs operates to move both slides in the same direction, but the upper one to a greater extent than the lower one, so that the hook and guard are separated. A spiral spring $e$, fastened at one end to the lazy-tongs and at the other end to the casing, exerts itself to lengthen the lazy-tongs and maintain the parts in the positions shown in Fig. 2. It will be seen that depression of the hook with its slide has the effect of drawing the guard down upon the hook by reason of the lazy-tongs connection. Thus when anything is hung upon the hook the tendency is to close the guard down upon it. The weight of the garment or other article hung upon the hook may be sufficient to overcome the spring $e$ and draw down the guard, but if not the user will pull down the hook so as to close the guard upon the same. A locking apparatus of the following-described construction is employed to hold the guard down upon the garment: The slide $c$ carries a ratchet-rack $f$, and there are independently pivoted to the casing a pair of dogs $g$ and $g'$, each formed with two or more teeth $g^2$ to engage the said rack. Each of said dogs is pressed by a spring $h$ into engagement with the rack, and the object of providing two dogs is to allow for a finer adjustment, the location of the teeth of the dogs being such that when those of one dog are engaging the teeth of the rack those of the other dog are at an intermediate position between the teeth of the rack, as clearly shown in Fig. 6. The backs of the teeth of the dogs are beveled to correspond with the bevel of the teeth of the rack, so that they form no obstruction to the downward movement of the slide $c$, the teeth of the rack displacing the dogs by the engagement of the bevels.

The following-described means are employed to disengage the dogs from the rack when the hook and guard are to be separated:

One of the dogs is formed with a projection $i$, having two or more V-shaped teeth $i'$, and a key $j$ is employed having a screw-threaded end $j'$ to engage said V-shaped teeth, so that by the turning of said key the dog $g'$ is withdrawn from the rack. The other dog $g$ is formed with an angular projection $g^3$, providing an abutment for a shoulder $g^4$ on the dog $g'$, so that the outward movement of the latter may be transmitted to the dog $g$.

The casing is formed with a circular keyhole $j^2$, (see Fig. 10,) from one side of which projects a pin $j^4$, and the key has a longitudinal groove $j^5$, which slides over said pin. The key is formed with a reduced portion or shank $j^6$ between its head or handle and the screw-threaded part, so as to accommodate the pin when the key is turned. By this construction the key is properly confined when in operation, as will be apparent.

It will be seen that by the above-described construction the objects primarily stated are effectively accomplished.

Having thus explained the nature of the invention and described a way of constructing and using the same, though without attempting to set forth all of the forms in which it may be made or all of the modes of its use, I declare that what I claim is—

1. A holder comprising a suitable base-plate or casing, slides therein, one having a supporting-hook and the other a guard for said hook, lazy-tongs connected with the said casing and with the slides, and means for locking the slides.

2. A holder comprising a suitable base-plate or casing, slides therein one having a supporting-hook and the other a guard for said hook, lazy-tongs connected with the said casing and with the slides, a spring connecting the casing and the lazy-tongs and exerting itself to distend the latter, and means for locking the slides.

3. A holder comprising a suitable base-plate or casing, slides therein one having a supporting-hook and the other a guard for said hook, lazy-tongs between the slides whereby motion may be imparted from one to the other, a rack on one of the slides, a pair of independently-pivoted dogs to engage said rack, and means for operating the dogs.

4. A holder comprising a suitable base-plate or casing, slides therein one having a supporting-hook and the other a guard for said hook, connections between the slides whereby motion may be imparted from one to the other, a rack on one of the slides, a pair of independently-pivoted dogs to engage said rack and having abutments and means operating in connection with one of the dogs to withdraw the same from the rack, the engagement of the abutments effecting the withdrawal of the other dog.

5. A holder comprising a suitable base-plate or casing, slides therein one having a supporting-hook and the other a guard for said hook, lazy-tongs between said slides whereby movement of one is imparted to the other, a locking-dog arranged to engage one of said slides and having a toothed projection, and a key with screw-threads to engage the said toothed projection.

In testimony whereof I have signed my name to this specification, in the presence of two subscribing witnesses, this 3d day of October, A. D. 1897.

JACOB F. MAIN.

Witnesses:
E. BATCHELDER,
A. D. HARRISON.